United States Patent
Min et al.

(10) Patent No.: US 6,633,868 B1
(45) Date of Patent: Oct. 14, 2003

(54) SYSTEM AND METHOD FOR CONTEXT-BASED DOCUMENT RETRIEVAL

(75) Inventors: Shermann Loyall Min, 77 Paloma Ave. #203, Pacifica, CA (US) 94044; Constantin Lorenzo Tanno, San Francisco, CA (US); Zachary Frank Mainen, Cold Spring Harbor, NY (US); William Russell Softky, Menlo Park, CA (US)

(73) Assignee: Shermann Loyall Min, Foster City, CA (US)

( * ) Notice: Subject to any disclaimer, the term of this patent is extended or adjusted under 35 U.S.C. 154(b) by 312 days.

(21) Appl. No.: 09/627,617

(22) Filed: Jul. 28, 2000

(51) Int. Cl.$^7$ .............................................. G06F 17/30
(52) U.S. Cl. .............................................. 707/3; 707/4
(58) Field of Search .............................. 705/5; 345/440; 400/63; 707/101, 3, 102, 4

(56) References Cited

U.S. PATENT DOCUMENTS

| | | | | |
|---|---|---|---|---|
| 5,619,709 A | | 4/1997 | Caid et al. ...................... | 704/9 |
| 5,692,176 A | * | 11/1997 | Holt et al. ...................... | 707/5 |
| 5,717,914 A | * | 2/1998 | Husick et al. ............... | 345/440 |
| 5,737,734 A | * | 4/1998 | Schultz ........................ | 400/63 |
| 5,926,812 A | | 7/1999 | Hilsenrath et al. ............. | 707/5 |
| 6,212,532 B1 | * | 4/2001 | Johnson et al. ................ | 707/3 |
| 6,272,495 B1 | * | 8/2001 | Hetherington ............... | 707/101 |
| 6,353,823 B1 | * | 3/2002 | Kumar ........................ | 707/102 |
| 6,363,377 B1 | * | 3/2002 | Kravets et al. ................ | 707/4 |

OTHER PUBLICATIONS

Alan F. Smeaton, Mark Burnett, Francis Crimmins and Gerard Quinn"An Architecture for Efficient Document Clustering and Retrieval on a Dynamic Collection of Newspaper Texts" 1998.*

* cited by examiner

*Primary Examiner*—Charles Rones
*Assistant Examiner*—Yicun Wu
(74) *Attorney, Agent, or Firm*—Lumen Intellectual Property Services, Inc.

(57) ABSTRACT

A system and method for document retrieval is disclosed. The invention addresses a major problem in text-based document retrieval: rapidly finding a small subset of documents in a large document collection (e.g. Web pages on the Internet) that are relevant to a limited set of query terms supplied by the user. The invention is based on utilizing information contained in the document collection about the statistics of word relationships ("context") to facilitate the specification of search queries and document comparison. The method consists of first compiling word relationships into a context database that captures the statistics of word proximity and occurrence throughout the document collection. At retrieval time, a search matrix is computed from a set of user-supplied keywords and the context database. For each document in the collection, a similar matrix is computed using the contents of the document and the context database. Document relevance is determined by comparing the similarity of the search and document matrices. The disclosed system therefore retrieves documents with contextual similarity rather than word frequency similarity, simplifying search specification while allowing greater search precision.

11 Claims, No Drawings

SYSTEM AND METHOD FOR CONTEXT-BASED DOCUMENT RETRIEVAL

FIELD OF THE INVENTION

The present invention relates generally to computer-implemented techniques for information retrieval. More specifically, it relates to query-based search engines and methods for improved searching through the use of contextual information.

BACKGROUND ART

The basic goal of a query-based document retrieval system is to find documents that are relevant to the user's input query. Since a typical query comprises only a few words, prior art techniques are often unable to discriminate between documents that are actually relevant and others that simply happen to use the query terms.

Conventional search engines for unstructured text documents can be divided into two groups: keyword-based, in which documents are ranked on the incidence (i.e., the existence and frequency) of keywords provided by the user, and categorization-based, in which information within the documents to be searched, as well as the documents themselves, are pre-classified into "topics" that are used to augment the retrieval process. The basic keyword search is well-suited for queries in which the topic can be described by a unique set of search terms. This method selects documents based on exact matches to these terms and then refines searches using Boolean operators (and, not, or) that allow users to specify which words and phrases must and must not appear in the returned documents. Constructing Boolean search queries is considered laborious and difficult for most people to use effectively. Moreover, unless the user can find a combination of words appearing only in the desired documents, the results will generally contain too many unrelated documents to be of use.

Several improvements have been made to the basic keyword search. Query expansion is a general technique in which keywords are used in conjunction with a thesaurus to find a larger set of terms with which to perform the search. Query expansion can improve recall (i.e., results in fewer missed documents) but usually at the expense of precision (i.e., results in more unrelated documents) due in large part to the increased number of documents returned. Natural language parsing falls into the larger category of keyword pre-processing in which the search terms are first analyzed to determine how the search should proceed (e.g., Infoseek's Ultraseek Server). For example, the query "West Bank" comprises an adjective modifying a noun. Instead of treating all documents that include either "west" or "bank" with equal weight, keyword pre-processing techniques can instruct the search engine to rank documents that contain the phrase "west bank" more highly. IBM's TextMiner makes extensive use of query expansion and keyword pre-processing methods, recognizing $\sim 10^5$ commonly used phrases. Even with these improvements, keyword searches may fail in many cases where word matches do not signify overall relevance of the document. For example, a document about experimental theater space is unrelated to the query "experiments in space" but may contain all of the search terms.

Categorization methods attempt to improve the relevance by inferring "topics" from the search terms and retrieving documents that have been predetermined to contain those topics. The general technique begins by analyzing the document collection for recognizable patterns using standard methods such as statistical analysis (e.g., Excite's Web Server) and neural network classification (e.g., Autonomy's Agentware). As with all such analyses, word frequency and proximity are the parameters being examined and/or compiled. Documents are then "tagged" with these patterns (often called "topics" or "concepts") and retrieved when a match with the search terms or their associated topics have been determined. In practice, this approach performs well when retrieving documents about prominent (i.e., statistically significant) subjects. Given the sheer number of possible patterns, however, only the strongest correlations can be discerned by a categorization method. Thus, for searches involving subjects that have not been pre-defined, the subsequent search typically relies solely upon the basic keyword matching method is susceptible to the same shortcomings.

It is appropriate to note here that many categorization techniques use the term "context" to describe their retrieval processes, even though the search itself does not use any contextual information (i.e., how collections of words appear relative to one another in order to define a context). U.S. Pat. No. 5,619,709 to Caid et. al. is an example of a categorization method that uses the term "context" to describes various aspects of their search. Caid's "context vectors" are essentially abstractions of categories identified by a neural network; searches are performed by first associating, if possible, keywords with topics (context vectors), or allowing the user to select one or more of these pre-determined topics, and then comparing the multidimensional directions of these vectors with the search vector via the mathematical dot product operation (i.e., a projection). In many respects, this process is identical to the keyword search in which word occurrence vectors are projected on a keyword vector.

U.S. Pat. No. 5,926,812 to Hilsenrath et. al. describes an improvement to the ranking schemes of conventional search engines using a technique similar to categorization. Hilsenrath's application is rather specialized in that the search relies upon first having a set of documents about the topic of interest in order to retrieve more like it, rather than the more difficult task of finding related documents using only a limited set of keywords provided by the user. Hilsenrath's method first analyzes a set of documents and extracts a "word cluster" which is analogous to the "topics" described above. The words defined by this word cluster are then fed to an existing keyword-based search engine, which returns a set of documents. These documents are then re-ranked by comparing the original word cluster with similar ones computed for each document. Although the comparison step does use context-like information (e.g., word pair proximities), the overall method is fundamentally limited by the fact that it requires already having local documents related to the topic of interest. The quality of the search is also limited by the quality and completeness of these local documents. In some sense, it is really an improvement to a 'more like this document' search feature than a complete query-based document retrieval method.

SUMMARY OF THE INVENTION

The disclosed invention provides a computer-implemented method for improving query-based document retrieval using the vast amount of contextual information (i.e., information about the relationships between words) within the document collection to be searched. The goals of a context-based search are 1) to take advantage of this wealth of information in order to automatically facilitate the specification of search topics from a limited set of search terms, and 2) to rank documents using a measure of contextual similarity that takes into an account the usage and relationship of all words within a each document. Essentially, words related to a particular topic tend to frequently occur in close proximity to one another. When the user specifies a query, the information compiled from the document collection can be enough to determine the desired topic and reconstruct the associated context (e.g., related words, usage proportions, etc.). Documents with the greatest contextual similarity are most likely to be relevant to the search topic.

As implied in the Background Art, categorization techniques also rely upon the fact that even without a "semantic" understanding of a text, highly useful contextual information can be read and compiled from a document collection by analyzing the statistics of word occurrence. But unlike categorization, context-based searching recognizes that in order to use this contextual information effectively, all of the statistics must be kept. Instead of analyzing the compiled data beforehand and extracting a limited set of correlations and patterns, the present invention stores all of the compiled contextual information for use at the time of the search. In other words, this technique is effective for queries about all topics. From just a few query terms supplied by the user, this technique is able to perform a true contextual search, that is, one in which word frequencies, word pair (and higher order) proximities, and proportions of word appearance are essential elements of the retrieval and ranking process.

The feature that fundamentally differentiates the present invention from all other search engines is its utilization of a context database ("C-db"), a repository of unfiltered (i.e., not pre-categorized) word frequency and proximity statistics compiled from the documents to be searched. Using the query terms supplied by the user, the context search method computes a search matrix to retrieve relevant documents. A search matrix is a set of numerical values that specify a topic of interest within a multidimensional word relationship space. This matrix contains information not only about words and phrases used to describe the desired subject matter but about how these words and phrases appear relative to each other. It is important to note that search matricies are not and cannot be pre-determined; they are computed at the time of the search using the query terms supplied by the user. The added word relationship information from this search matrix draws upon information from the entire document collection to be searched and thus allows the subsequent search to apply a much more rigorous set of criteria for determining the relevance of each document to the topic of interest.

The context-based search comprises five general steps, not necessarily performed in the following order. First, the C-db is generated by analyzing word usage at the same time the search engine indexes a document collection. At a minimum, parameters such as word frequency, occurrence counts, and proximities are compiled during this step. Next, for each query, one or more search matrices are computed from the query terms using the contents of the C-db. The third step involves generating (or retrieving) a word relationship matrix for each document, thus preparing for the fourth step, a matrix comparison calculation that produces the final weight used to rank the relevance of each document. An optional fifth step of refining the search may be performed by replacing the original search matrix (derived from the query terms) with the word relationship matrix from a particular document (i.e. a 'more like this document' function).

The present approach improves on prior art in several important ways. The additional information provided by the context database and, in turn, the search matrix narrows the description of the desired topic: the more specific the area of interest is defined, the more accurate the results. Since the search uses the contextual (i.e., word relationship) information contained in the search matrix, documents are ranked not on the simple occurrence of individual words but on how these words appear in relation to each other. That is, a document must not only use relevant words in proximity to each other, but these words must be used in the proper proportions as well. This feature is particularly important for searches about topics described by common words (i.e., words associated with numerous subjects) because it is precisely the subtleties within collections of words, rather than the individual words themselves, that distinguishes one topic from another.

Defining a search matrix also allows useful generalization because the search is not limited to the keywords provided by the user. Relevant documents are found even when the original search terms are not present. Moreover, this method is able to recognize and discard documents which use the original search terms but do not contain the proper context. In short, the context search method improves both precision and recall specifically in situations that are most troublesome for conventional keyword and categorization search engines: queries about less popular topics that are difficult to define with a limited number of search terms.

DETAILED DESCRIPTION

Typical Hardware Architecture

The disclosed invention may reside on any computer system containing one or more central processing units and one or more storage devices (e.g., physical memory or any other volatile or non-volatile medium). For document retrieval over multiple computers, the system may include networking hardware. The computer-implemented process for context-based document retrieval is described below.

Generating the C-db

The C-db contains word relationship statistics found in the document collection to be searched. The first enabling step for a context-based search is the design and use of the C-db within the constraints of today's computer technology. The current embodiment stores word pair relationships weights, appearance histograms, etc. and is thus a simplified version of the full form in which all higher order relationships (i.e., word triplets, n-tuplets) are calculated. The main portion of the C-db, C, is a list of N vectors, where N is the total number of unique words (or word units, such as phrases) in the document collection to be searched. Each vector corresponds to a particular word and contains a relationship weight with every other word in the list. C is therefore an N×N square matrix (in its full form). In the English language, N is on the order of $10^5$; when common phrases are considered, N may increase to $10^6$. Thus, $10^{10} < N^2 < 10^{12}$, so the non-compressed storage requirements for the C-db is estimated at 10–1000 Gb. In practice, the C-db, and all associated data, is several orders of magnitude smaller (the exact amount is determined by the size contents of the document collection). The rest of the C-db contains various information such as a word histogram, collection frequency weights, etc. All of these are well-known statistical values which may be easily calculated by anyone skilled in the art of document retrieval methods. If desired, a word pair incidence count matrix may be stored as well. This matrix keeps track of the number of times a particular word pair is encountered within the document collection (a value used for normalization purposes).

The values in C are computed on a per-document basis. A particular value within C represents the relationship between the two words (or word units or phrases) corresponding to the value's row and column. For each word in a document, a relationship weight is calculated for every surrounding word. The value of this weight is determined by a word relationship function based on separation (proximity); nearby words are assigned a larger weight than distant words (e.g., weight=1/s, where s is the word separation). Each appearance of a word pair updates the corresponding values within the C-db in an additive fashion. This allows easy parallelization of the code for execution on multiple processors, useful when indexing large document collections (e.g., the Internet).

The following is an example of a C-db calculation for the sentence "Cooked chicken tastes good," using the proximity function 1/s. The relationship weights of the first word, "cooked," with "chicken," "tastes," and "good" would be 1, 0.5, and 0.33, respectively. C would therefore be:

|  | cooked | chicken | tastes | good |
|---|---|---|---|---|
| cooked | 0 | 1 | 0.5 | 0.33 |
| chicken | 1 | 0 | 0 | 0 |
| tastes | 0.5 | 0 | 0 | 0 |
| good | 0.33 | 0 | 0 | 0 |

The relationship weights of the second word, "chicken," with "cooked," "tastes," and "good" would be 1, 1, and 0.5, respectively. These values are added to the present values in C:

|  | cooked | chicken | tastes | good |
|---|---|---|---|---|
| cooked | 0 | 2 | 0.5 | 0.33 |
| chicken | 2 | 0 | 1 | 0.5 |
| tastes | 0.5 | 1 | 0 | 0 |
| good | 0.33 | 0.5 | 0 | 0 |

Relationship weights for "tastes" and "good" are calculated in the same manner, resulting in the following values for C:

|  | cooked | chicken | tastes | good |
|---|---|---|---|---|
| cooked | 2 | 2 | 1 | 0.67 |
| chicken | 2 | 2 | 2 | 1 |
| tastes | 1 | 2 | 2 | 2 |
| good | 0.67 | 1 | 2 | 2 |

Notice that since word pair relationships are commutative, C is a symmetric matrix. The lower half of the matrix, therefore, does not need to be saved. In practice, this half of the matrix is used to store word pair incidence counts (e.g., the number of times a particular value within the upper half of C is updated—this information is for normalization procedures to be described below). The elements along the diagonal of C in theory represent the relationship of words with themselves. In practice, they are arbitrarily set to values that are convenient for the calculations being performed.

In order for the above procedure to be useful and practical, the process of indexing the document collection must be sufficiently fast to accommodate large databases, and results from searches should be generated in a timely manner (i.e., within a few seconds). Towards these ends, several aspects of the algorithm can be streamlined to reduce memory requirements and computation time. For a typical proximity function, contributions from word pairs with separations in excess of a few tens of words are insignificant and can be safely ignored. This reduces the number of computations and memory moves from $M^2$, where M is the total number of words in the document collection, to $C*M$, where C is the maximum significant separation distance.

A second improvement exploits the fact that C is a sparse matrix (that is, it contains mostly zeros) and can be encoded as such using standard methods to minimize storage space. A sparse representation of C may be small enough to reside in physical memory, thereby greatly increasing indexing speed by reducing disk access. To further reduce the size of C, small values within C that are deemed at the level of "noise" (i.e., the value representing a random occurrence of a word pair) may be removed (i.e., set to zero). This noise level is a function of the document collection's size, number of unique words, etc., and can be determined empirically or estimated theoretically.

Computing the Search Matrix

For each keyword input by the user, the corresponding column vector in the C-db, $v_i$, is retrieved and normalized by the appropriate factors (e.g., the collection frequency weight, term weight, incidence counts, etc.). Although these normalization factors play an important role in producing good results, their use is common throughout the prior art and will not be discussed in this disclosure. Using the example C-db in the last section, the vectors associated with the query "cooked chicken good" are:

| cooked: | [ 2 2 1 0.67 ] |
| chicken: | [ 2 2 2 1 ] |
| good: | [ 0.67 1 2 2 ] |

Since each word only appears once in this example, normalization factors do not need to be applied.

These vectors are then combined to form a resultant vector, V, which contains the values that define the topic of interest. The current implementation is essentially an intersection function: the vectors are multiplied together on an element-by-element basis, after a threshold function (which sets values below a certain threshold to zero) is applied to each vector. Mathematically, the resultant vector can be expressed as $V = v_1 \cdot v_2 \cdot v_3$, where $v_1$, $v_2$, and $v_3$, represent the vectors within C that correspond to the two keywords, and the (·) operator represents an array (element-by-element) multiplication.

$$V = [2*2*0.67\ 2*2*1\ 1*2*2\ 0.67*1*2] = [2.7\ 4\ 4\ 1.3]$$

Once V is obtained, the search matrix, S, is simply $V^T V$, where $V^T$ is the transpose of V. The size of S is n×n, where n is the number of nonzero terms of V.

$$S = [2.7\ 4\ 4\ 1.3]^T * [2.7\ 4\ 4\ 1.34]$$

$$= \begin{pmatrix} 7.2 & 10.7 & 10.7 & 3.6 \\ 10.7 & 16 & 16 & 5.4 \\ 10.7 & 16 & 16 & 5.4 \\ 3.6 & 5.4 & 5.4 & 2.7 \end{pmatrix}$$

The goal of the resultant vector calculation is to use the vectors associated with the keywords to find a set of relationships weights that uniquely define the topic of interest.

Since each vector contains relationship weights derived from many topics, the assumption behind the intersection function is that words related to the desired topic are contained in all of the associated C-db vectors. For example, in a typical newspaper archive, the term "resuscitation" should appear prominently (i.e., have a large relationship weight) in the vectors associated with both "cardiac" and "arrest" and thus be included in the resultant vector derived from the query "cardiac arrest". "old age" and "hospital" should also appear in the resultant but their relationship values should be lower than that of "resuscitation" since they are less directly related to "cardiac arrest" (and presumably appear farther away in documents pertaining to cardiac arrest). There are many ways to generate a resultant vector, from simple array addition ($V=v_1+v_2+v_3$) to a summation of vector combinations ($V=v_1 \cdot v_2+v_1 \cdot v_3+v_2 \cdot v_3$). The intersection function was chosen for the current implementation because of its simplicity and effectiveness.

Various resultant vectors with other desirable properties may also be computed. For example, V may be used to find the elements outside of the intersection, V'. V' contains information regarding undesirable words and may therefore be used as an added mechanism for identifying documents with the improper context. Using the above example, "police" would be highly associated with "arrest" but not at all to "cardiac" and would thus be captured by V' as an undesirable word.

Similarly, keyword modifiers analogous to the Boolean operators used in keywords searches may be used to affect how the resultant vector(s) and/or search matrix is(are) computed. For example, a minus sign (−) placed before a query term (or a set of query terms) may instruct the search algorithm to include the associated C-db vector(s) in the calculation of V', thereby adding the capability for the search routine to exclude undesirable topics, as opposed to simply undesirable words, specified by the user.

Ranking the Documents

For each document, i, a matrix D(i) is calculated in the same manner as the C-db, C. That is, the elements of the square matrix are determined by the proximity and frequency of word pairs. (C is in fact the summation of all D(i) matrices; thus both the C and D(i) may be pre-computed to decrease retrieval times.) The elements on the diagonal may be set to zero so that only relationships between word pairs are taken into account. Normalization factors may also be applied to adjust for parameters such as document length, word pair frequency, etc. The matrix product of D(i) and S (that is, an element-by-element multiplication, followed by a summation of all elements to produce a scalar) computes a weight, W(i), that correlates with the number and proximity of relevant word pairs found in each document. The product should be limited to elements common to both matrices in order to minimize the total number of computations. The final document ranking, R, is a simple sorting of the weights from highest to lowest values: $R=Sort\{W\}$.

This calculation is essentially a cross correlation between two aligned sets; the highest value is produced when the two sets are identical. In other words, documents that generate high weights use relevant words in the proper proportion and in close proximity to each other. In general, high weights may be generated from documents that do not even contain any of the original search terms. This method thus provides a comprehensive yet forgiving measure of a document's relevance.

W(i) may also be used to generate a percentage, P, to be reported with each result as a confidence measure of a document's relevancy. For a given S, the largest possible weight, $W_{ideal}$, may easily be computed and used as the normalization factor, thus ensuring the P is between 0 and 1. Since W(i) will be, for most documents, far from ideal, a nonlinear scale may be applied to redistribute P(i) more evenly between 0 and 1.

$$P(i)=W(i)/(W_{ideal})*(\text{nonlinear scale})$$

As mentioned above, the final weight assigned to each document can be modified in several ways to further improve its measure of relevance. For example, a dot product between V' and a document's word frequency vector produces a measure of its undesirable word usage, U(i). Documents with high such values are lowered in rank (e.g., $R=Sort\{W(i)/U(i)\}$).

Refining Search Results

Once a set of documents have been retrieved, the user may find that several subjects are described by the original search terms. If a particular returned document, j, is found to embody the desired subtopic, a highly effective refinement search (i.e., a 'more like this document' function) may be performed by setting the search matrix, S, equal to D(j) and re-ranking the document collection.

Other Embodiments

The invention that enables a context-based search is the design and use of the C-db to generate the search matrix. The current implementation improves document retrieval results by calculating relationships of, and expanding searches to, word pairs rather than single words. This word pair approach may easily be generalized to groups of words and phrases of any size. As computer memory and processing speed improve, it may become possible to increase relationship calculations to word triplets (or higher permutations). The search matrix then becomes a search tensor.

While the current implementation is based on single words, the method can be readily improved by treating common short phrases (e.g. person and place names) as single word units during the C-db generation process and during the search. This addition will increase storage requirements by only a modest amount (i.e., linearly) but dramatically improve the results of searches using these phrases.

There are many variations to the exact contents of C. For example, the step of converting word separations into a relationship weight may be delayed until the time of the search. Instead, the sum of all word pair distances may be stored in C instead. The word relationship function would be applied after the word distances are normalized by the incidence count. If storage space is a concern, neither word distances nor incidence counts need to be stored. C would contain the relationship weights as described earlier and approximate normalizations derived from the word histogram could be used.

Calculating D(i) for each document at the time of the search may be impractical for large document collections. By limiting the calculation to only the portion of D(i) that contributes to the final weight of each document, D(i) may be determined at a greatly reduced computational cost during the search. Alternatively, as mentioned earlier, D(i) may be pre-calculated, increasing the speed of the search at the expense of storage cost.

There are several ways to use portions of the disclosed method to retrieve documents. If retrieval speed is a priority, a simple dot product between the resultant vector, V, and a document's word frequency vector, in place of calculation with the full matrix D(i), is an efficient method for producing the relevance weight. This results in a decrease in performance due to the elimination of word pair proximity information embedded in the disclosed search method. For certain applications, this loss may be acceptable.

As described in the Summary of the Invention section, the disclosed document retrieval technique is especially well-suited for a particular type of search, namely one in which the user is unable to generate a set of keywords which uniquely define the desired topic. This is often the case when the user is unfamiliar with the topic at hand (e.g., when performing research on a new subject), when the topic itself can be described in a number of ways (e.g., "laser ultrasonics" and "optical detection of waves"), or when the words that define the topic have frequent common uses (e.g., "gaming laws"). It is thus desirable to combine this technique with conventional methods that are well-suited for other types of searches. One such method already mentioned is the application of semantic analysis or natural language parsing techniques to define the word units (common phrases, proper names, etc.) that comprise the vectors stored in the C-db. Similar analysis may then be used on the query terms in order to retrieve the proper vectors necessary to compute the search matrix. Categorization and clustering algorithms may be applied after the search to the retrieved documents, sorting them to highlight the differences between similar documents.

What is claimed is:

1. A computer-implemented context-based document retrieval method comprising:
   a) for each document, i, in a document collection, computing a word relationship matrix D(i) comprising proximity statistics of word pairs in the document; and calculating for each document a word frequency vector;
   b) generating a context database comprising an N×N matrix C, wherein C is computed from the word relationship matrices D(i) of all the documents in the document collection, where N is a total number of unique words in the document collection;
   c) computing a search matrix S from a search query and the matrix C;
   d) for each document, i, computing a weight W(i) from the search matrix S and the word relationship matrix D(i) for the document; and
   e) retrieving and ranting documents based on the weights W(i).

2. The method of claim 1 wherein the word relationship matrix D(i) further comprises word pair incidence counts.

3. The method of claim 1 wherein computing C comprises adding the matrices D(i) of all the documents in the document collection.

4. The method of claim 1 wherein computing S comprises selecting column vectors of C corresponding to keywords of the search query, and forming S from the column vectors.

5. The method of claim 1 wherein computing W(i) comprises element-by-element multiplication of D(i) and S, followed by a summation of all resulting elements.

6. A computer-implemented context-based document retrieval method comprising:
   a) for each document, i, in a document collection, computing a word-phrase relationship matrix D(i) comprising proximity statistics of word n-tuples in the document; wherein n is a number of words in each word-phrase relationship; and calculating for each document a word-phrase frequency vector;
   b) generating a context database comprising an N×N matrix C, wherein C is computed from the word-phrase relationship matrices D(i) of all the documents in the document collection, where N is a total number of unique word-phrases in the document collection;
   c) computing a search matrix S from a search query and the matrix C;
   d) for each document, i, computing a weight W(i) from the search matrix S and the word-phrase relationship matrix D(i) for the document; and
   e) retrieving and ranking documents based on the weights W(i).

7. The method of claim 6 wherein the word-phrase relationship matrix D(i) further comprises word-phrase incidence counts.

8. The method of claim 6 wherein computing C comprises adding the matrices D(i) of all the documents in the document collection.

9. The method of claim 6 wherein computing S comprises selecting column vectors of C corresponding to keyword-phrases of the search query, and forming S from the column vectors.

10. The method of claim 6 wherein computing W(i) comprises element-by-element multiplication of D(i) and S, followed by a summation of all resulting elements.

11. A computer-implemented context-based document retrieval method comprising:
   a) for each document, i, in a document collection, computing a word-phrase relationship tensor D(i) comprising proximity statistics of word-phrase n-tuples in the document, where n is at least two; wherein n is a number of words in each word-phrase relationship; and calculating for each document a word-phrase frequency vector;
   b) generating a context database comprising a tensor C, wherein C is computed from the word-phrase relationship tensors D(i) of all the documents in the document collection;
   c) computing a search tensor S from a search query and the tensor C;
   d) for each document, i, computing a weight W(i) from the search tensor S and the word-phrase relationship tensor D(i) for the document, and
   e) retrieving and ranking documents based on the weights W(i).

* * * * *